US008662442B2

(12) United States Patent
Stamps et al.

(10) Patent No.: US 8,662,442 B2
(45) Date of Patent: Mar. 4, 2014

(54) ACTIVE PROP ROTOR STABILITY SYSTEM

(75) Inventors: Frank B. Stamps, Colleyville, TX (US);
David A. Popelka, Colleyville, TX (US);
Charles Eric Covington, Colleyville, TX (US); Thomas C. Parham, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 8 days.

(21) Appl. No.: 13/286,677

(22) Filed: Nov. 1, 2011

(65) Prior Publication Data
US 2013/0105637 A1 May 2, 2013

(51) Int. Cl.
*B64C 13/16* (2006.01)
(52) U.S. Cl.
USPC ............................ 244/76 R; 244/7 R; 701/3
(58) Field of Classification Search
USPC ............... 244/76 R, 17.11, 17.27, 7 R, 17.13; 701/3, 4
See application file for complete search history.

(56) References Cited

U.S. PATENT DOCUMENTS

| | | | | |
|---|---|---|---|---|
| 6,001,715 A * | 12/1999 | Manka et al. | .................. | 438/535 |
| 6,231,005 B1 * | 5/2001 | Costes | ........................ | 244/17.25 |
| 6,454,206 B2 * | 9/2002 | Vincent | ........................ | 244/17.27 |
| 6,574,572 B2 * | 6/2003 | Bechhoefer | ...................... | 702/56 |
| 6,616,095 B2 * | 9/2003 | Stamps et al. | .............. | 244/17.13 |
| 7,118,328 B2 * | 10/2006 | Welsh et al. | ............... | 416/170 R |
| 7,548,800 B2 * | 6/2009 | Jones et al. | ......................... | 701/3 |
| 7,970,498 B2 * | 6/2011 | Sahasrabudhe et al. | ........... | 701/3 |
| 7,988,089 B2 * | 8/2011 | Wittmer | ....................... | 244/17.13 |
| 8,052,094 B2 * | 11/2011 | Roesch | .......................... | 244/177 |
| 8,132,763 B2 * | 3/2012 | Schievelbusch | ............... | 244/215 |
| 8,226,030 B2 * | 7/2012 | Mast et al. | ..................... | 244/108 |
| 8,287,237 B2 * | 10/2012 | Stamps et al. | ................. | 416/102 |
| 8,382,028 B2 * | 2/2013 | Jolly | .......................... | 244/17.13 |
| 2002/0134883 A1 * | 9/2002 | Stamps et al. | ................. | 244/7 R |
| 2010/0095788 A1 * | 4/2010 | Mast et al. | ............... | 73/862.541 |
| 2010/0185344 A1 * | 7/2010 | Roach | ................................ | 701/4 |
| 2011/0194934 A1 * | 8/2011 | Popelka et al. | .................... | 416/1 |
| 2012/0230823 A1 * | 9/2012 | Stamps et al. | ................. | 416/135 |
| 2012/0305698 A1 * | 12/2012 | Schank et al. | .............. | 244/17.11 |

OTHER PUBLICATIONS

Canadian Office Action date Nov. 22, 2013 from counterpart CA App. No. 2,790,435.

* cited by examiner

*Primary Examiner* — Christopher P Ellis
*Assistant Examiner* — Medhat Badawi
(74) *Attorney, Agent, or Firm* — James E. Walton; Richard G. Eldredge

(57) ABSTRACT

A system and method for adjusting a rotor blade upon detection of a harmful force exerted on an aircraft wing includes a sensor attached to the wing and a subsystem operably associated with the sensor. The method includes sensing the force exerted on the wing with the sensor and determining whether the sensed force is potentially harmful to the structural integrity of the wing. The method further includes counteracting the harmful force by adjusting the rotor blade movement.

8 Claims, 7 Drawing Sheets

ACTIVE PROP ROTOR STABILITY SYSTEM

BACKGROUND

1. Field of the Application

The present application relates in general to propulsion systems for aircraft which are operable in at least a helicopter mode of flight. The present application has a particular applicability in the field of tilt rotor aircraft which are operable in either an airplane mode of flight or a helicopter mode of flight.

2. Description of Related Art

The control systems for helicopters and tilt rotor aircraft are complex electrical and/or mechanical systems. The control systems respond to the pilot's input, but also must accommodate forces acting upon rotor assemblies which are generally outside the control of the pilot. Mechanical control systems typically include a swashplate arrangement which consists of a stationary portion and a rotating portion. Typically, the lower, stationary portion is fixed in position and will not rotate, but has the ability to move up and down and/or tilt in any given direction. This is commonly referred to as the "stationary" or "nonrotating" plate. Pilot inputs alter the vertical position of the stationary plate through the collective control and the tilt of the stationary plate through the cyclic control. The rotating portion of the swashplate arrangement is free to rotate. Of course, pilot inputs to the nonrotating portion are passed through to the rotating portion of the control systems.

The rotating portion is typically connected mechanically to each individual rotor blade. For example, in one type of control system, pitch links are connected to pitch horns which are carried by the rotor blade, thus allowing the rotating plate to alter the blade angle of each rotor blade. However, it is necessary to include in control systems a subsystem which reduces the degree of flapping as much as possible. In the prior art, there are two basic approaches: one is to utilize a delta-3 hinge; the other is to utilize offset pitch horns.

In tilt rotor aircraft, it is especially important to counteract the detrimental effects of flapping, especially because the aircraft is capable of very high speed travel, particularly in the airplane mode of flight. In some scenarios, the excessive flapping and/or other forces exerted by the rotary blades can cause an adverse force on the wing, which could result in failure.

Although great strides have been made in the field of controlling forces of a rotary system, many shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
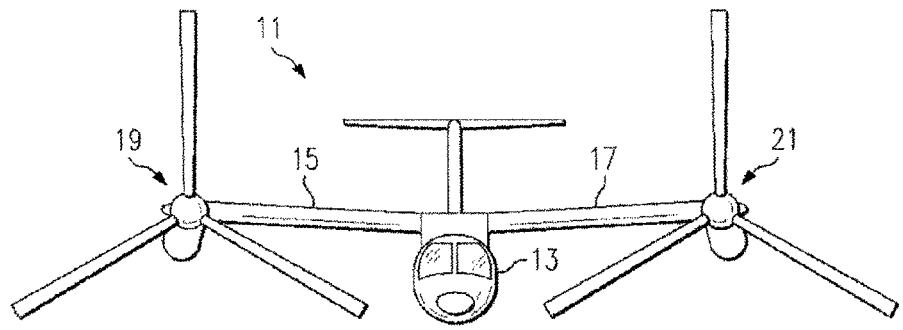
FIGS. 1, 2, and 3 depict one embodiment of the present application in a aircraft with tilt rotor assemblies.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes common disadvantages associated with conventional rotary systems. In particular, the rotary aircraft includes a control system having one or more sensors configured to sense rotational and bending movement on a wing of the aircraft, and configured to adjust the rotary blades accordingly to counteract any wing movement. The system provides significant advantages, namely, the system reduces, if not eliminates, failure of the aircraft wing caused by prop rotor aeroelastic instability during the airplane mode of flight.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings.

The present application is directed to improved aircraft and aircraft flight control systems. More particularly, the present application may be utilized in fixed wing aircraft as well as rotary wing aircraft. The rotary wing aircraft may include conventional helicopters, as well as aircraft with tilt rotor assemblies, such as the aircraft manufactured by Bell Helicopter Textron, Inc. and marketed under the "TILTROTOR" Trademark.

Figure 2:
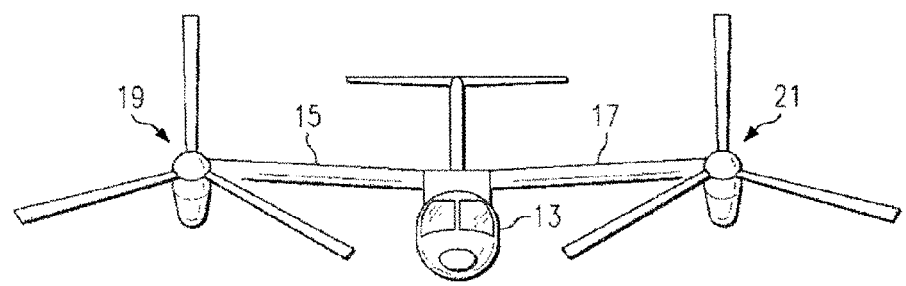
Figure 3:
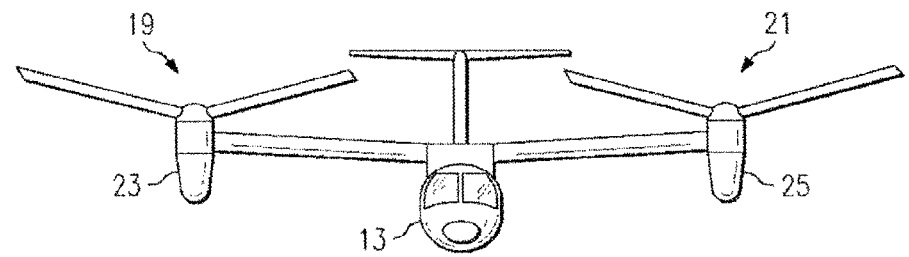

Referring now to the drawings wherein like reference characters identify corresponding or similar elements throughout the several views, FIGS. 1, 2, and 3 illustrate an aircraft utilizing the control system of the present application. FIG. 1 depicts a tiltrotor aircraft 11 in an airplane mode of flight operation. Wings 15, 17 are being utilized to lift craft body 13 in response to the action of propeller assemblies 19, 21. As is shown in the view of FIG. 1, the propeller assemblies 19, 21 are composed of a plurality of rotor blades which are rotated in a rotor disk which is substantially transverse to the craft body 13. In this mode, the rotor assemblies 19, 21 operate as twin engines for the airplane mode of flight. In contrast, FIG. 3 depicts the aircraft 11 in a helicopter mode of flight with rotor assemblies 19, 21 being positioned substantially parallel to the craft body 13. In this view, the pylons 23, 25 are depicted. Pylons 23, 25 rotate in position to allow switching between the aircraft mode of flight and the helicopter mode of flight.

FIG. 2 depicts the aircraft 11 in a transition mode with rotor assemblies 19, 21 being shifted in position between that of an aircraft mode of flight and a helicopter mode of flight. One significant advantage of this type of aircraft is the ability to take off and land in a manner like that of a helicopter, but with the ability to travel at relatively high speeds in the manner of an aircraft. The improved control system of the present application is integrated into a tilt rotor aircraft, such as that depicted in FIGS. 1-3, in order to make the flight operations more stable. This will be discussed in significantly greater detail below.

Figure 4:
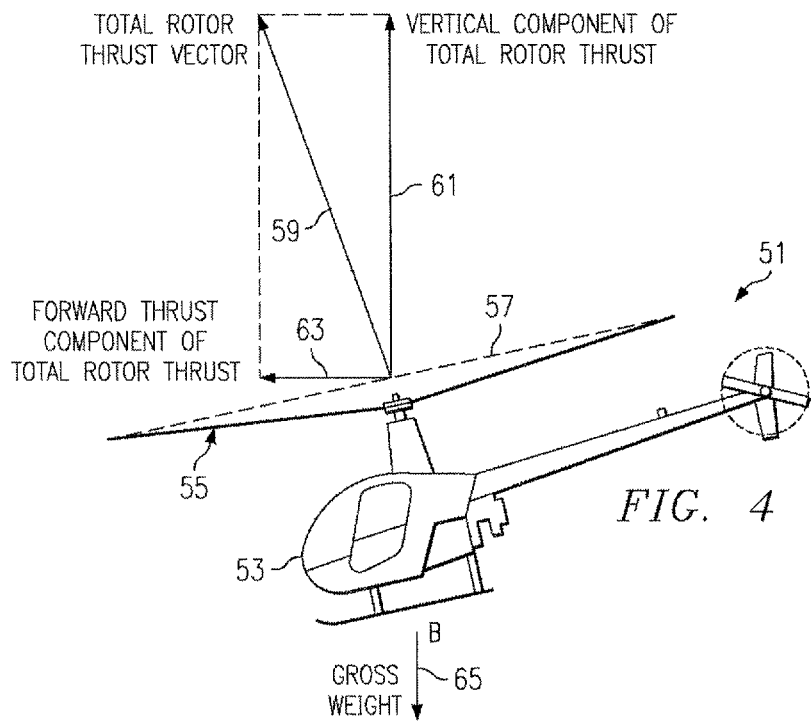
FIG. 4 is a depiction of an alternative embodiment of the present application which is a conventional helicopter aircraft with an improved control system.

Referring now to FIG. 4 in the drawings, a helicopter in accordance with the present application which integrates the control system of the present application is depicted. As is shown, helicopter 51 includes a fuselage 53 and rotor assembly 55. Rotor assembly 55 defines a rotor disk 57 which is substantially parallel to fuselage 53. The motion of helicopter 51 is determined by a rotor thrust vector 59 which is made up of the vertical component 61 and a forward thrust component 63. In the aggregate, the vertical component 61 of the rotor thrust vector 59 must offset the gross weight 65 which pulls downward on fuselage 53. The forward and backward motion of helicopter 51 is determined by the forward thrust component 63 of the total rotor thrust vector 59. In accordance with the preferred embodiment of the present application, the improved control system is integrated into helicopter 51 in order to stabilize the craft during the airplane mode of flight. One significant advantage of the present application is that it allows the utilization of a greater number of rotor blades than is typically utilized in commercial craft. For example, four, five, six, or more blades may be utilized when the present application is integrated into the rotary aircraft. This is possible because the present application allows for optimization of feedback systems in order to eliminate the instabilities associated with a delta-3 position or configuration which is less than optimum. This instability is very likely to occur in an aircraft which includes more than three rotor blades. The stabilizing effect of the present application will be discussed in greater detail below.

Figure 5:
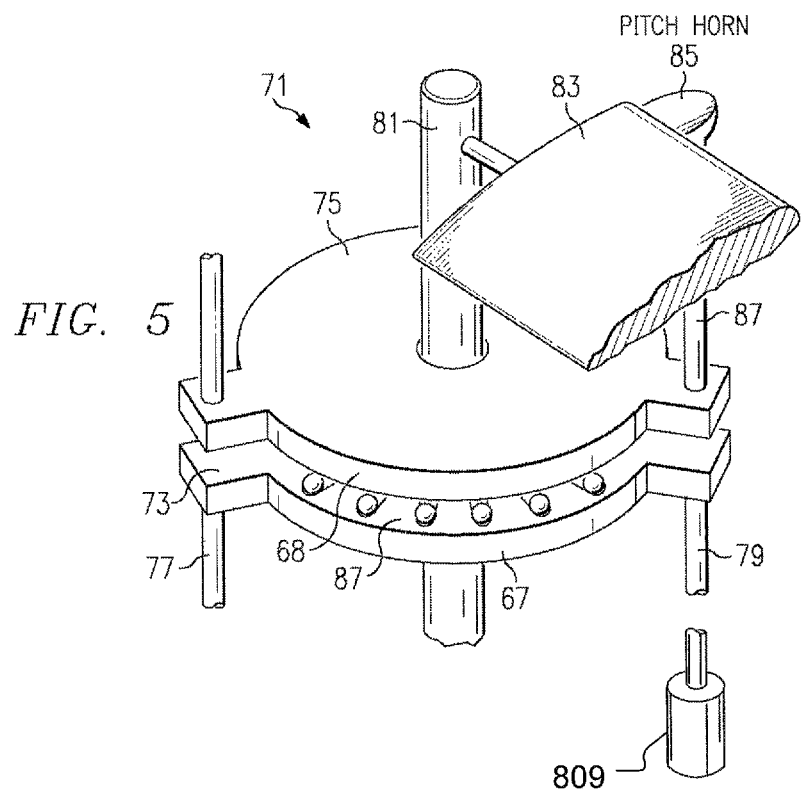
FIG. 5 is a simplified pictorial representation of one mechanical control system for a rotor assembly.

Referring now to FIG. 5 in the drawings, a simplified pictorial representation of a basic mechanical control system for use in a helicopter or tilt rotor aircraft is illustrated. This assembly is known as a "swashplate control system" and it includes a nonrotating portion 67 and a rotating portion 68. A mast 81 extends through the rotating and nonrotating members 67, 68 and is coupled to a plurality of blades, such as blade 83. Each blade is connected through a pitch horn, such as pitch horn 85, and a linkage such as pitch link 87 back to the nonrotating member 67 and to the pilot control systems. A hub 87 is provided which couples the rotor blades to mast 81 in a manner which transfers torque and thrust while allowing tilting of the rotor thrust vector. For example, in a mechanical system, the hub may comprise a gimbaled yoke, but in electromechanical systems may comprise other types of couplings. The hub is not depicted in this view in order to simplify the view.

The control system depicted in simplified form in FIG. 5 allows for the combination of collective control and cyclic control. Both collective control and cyclic control are accomplished through the swashplate arrangement, and the engineering details of the swash pate vary between helicopter designs. As discussed above, the upper portion of the assembly (the rotating portion) is free to rotate relative to the lower, stationary (non-rotating portion). Pilot inputs are provided to alter the vertical position of the stationary plate through the collective control and the tilt of the plate through the cyclic control. Since the rotating plate always follows the orientation of the stationary plate, any pilot input to the stationary plate is passed onto the rotating plate above it. The pitch links and pitch horns are utilized to allow the rotating plate to alter the blade angle of each blade. Pulling the collective lever up moves the swashplate vertically upward so that all blades contain the same increase in blade angle. Similarly, pushing the collective down decreases the blade angle of all blades. Variations in blade angle change the amount of total rotor thrust produced. Accordingly, changes in collective control cause changes in total rotor thrust but they do not alter total rotor thrust orientation.

Figure 6:
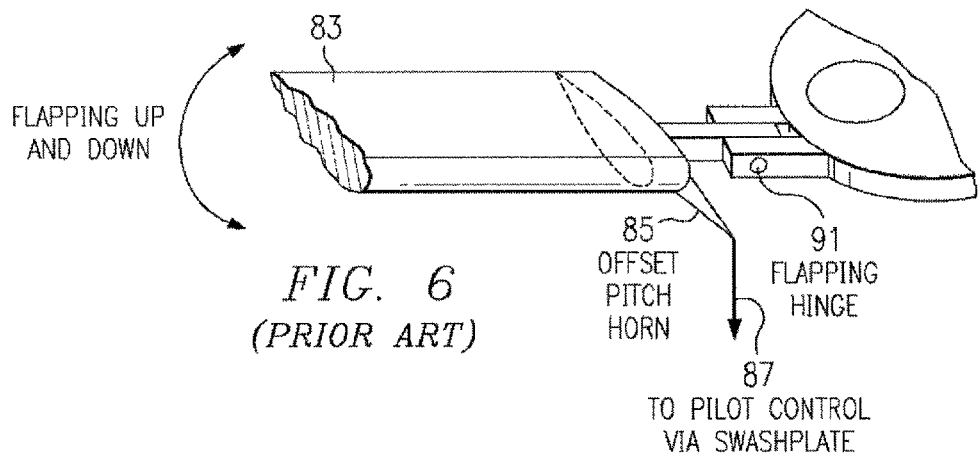
FIGS. 6, 7A, 7B, 7C, and 7D are simplified control representations of prior-art approaches for reducing flapping in a rotor assembly.

Referring now to FIGS. 6, 7A, 7B, 7C and 7D in the drawings, existing prior-art approaches for reducing the flapping of the rotors are depicted. The view of FIGS. 7A-7D is a simplified pictorial representation of the utilization of pitch horns to control flapping. The view of FIGS. 6 and 7A-7D are simplified pictorial representations of the utilization of delta-3 hinges. As is shown in FIG. 3, a blade 83 may be flapped up or down. It is connected to the hub assembly through flapping hinge 91 which allows the upward and/or downward flapping. As is shown in FIG. 6, an offset pitch horn 85 is coupled to one portion of blade 83. Link 87 is coupled to pitch horn 85 and supplies the flapping input to pilot control through the swashplate (not depicted in this view). In practice, when the blade 83 flaps up, the attachment of the pitch horn 87 to the leading edge of the blade arrests that part of the blade and the blade angle reduces. The reverse holds true when the blade 83 flaps down.

Figure 7A:
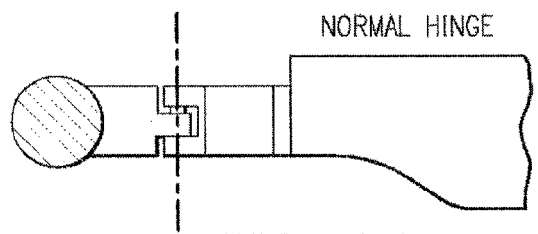
Figure 7C:
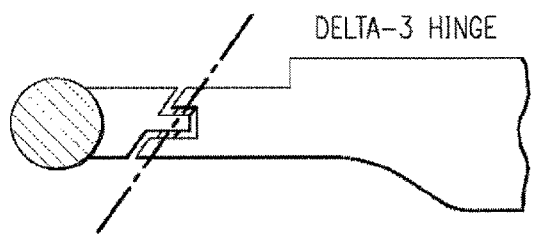
Figure 7B:
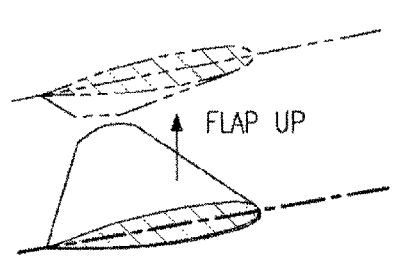
Figure 7D:
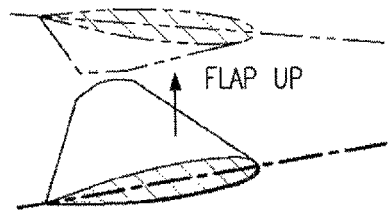

FIGS. 7A-7D depict an alternative to an offset pitch horn, namely the utilization of delta-3 hinges. Delta-3 hinges are set relative to the feathering axis at an angle other than 90 degrees. When the blade flaps up, the pitch angle reduces automatically. The hinge at 90 degrees to the feather axis, in contrast, does not cause any difference to the pitch angle when flapping. In the view of FIGS. 7A and 7B, the blade attaches to the rotor hub with right angle flapping hinges. FIG. 7B shows that flapping up and down has no influence on the pitch angle of the blade. Thus, any alteration in the lift coefficient to eliminate dissymmetry of lift happens solely by flapping up or down. In the view of FIGS. 7C and 7D an alternative is depicted with the flapping hinge at an angle other than 90 degrees. The blade flaps up out of the page, and the trailing edge rises more than the leading edge because of the geometry of the hinge. This is clearly shown in FIG. 7D, which depicts the flapping up as being associated with the decrease in pitch angle. This decrease helps reduce the lift coefficient so the blade flaps less to achieve the same result.

A tilt rotor aircraft can achieve very high airspeeds and altitudes when operating in the airplane mode configuration.

Existing tilt rotor aircraft have demonstrated airspeeds up to 385 knots and altitudes up to 20,000 feet, with emerging tilt rotor aircraft designs achieving even higher airspeeds. These capabilities offer significant benefits over conventional helicopters, but at the same time, introduce the possibility of new types of aeroelastic instability which are not present in conventional helicopters. Two of the most demanding stability issues are the prop rotor aeroelastic instability and the rotor flap-lag instability. A brief description of each of these stability problems is provided below.

A tilt rotor aircraft can experience a phenomena referred to as prop rotor aeroelastic instability in the airplane mode of flight. This instability is a result of adverse aeroelastic coupling of the rotor system and the wing and pylon system to which it is attached. This instability is a significant design driver, which implies that the requirements for wing structural stiffness and pylon mass properties are typically based on prop rotor aeroelastic stability requirements. If the rotor and wing design parameters are not selected properly, then the prop rotor aeroelastic instability may limit the useable speed range of a high-speed tilt rotor. For this reason, design solutions and control systems are sought which maximize the aeroelastic stability with the minimum weight impact.

The prop rotor aeroelastic instability is similar to classical propeller whirl flutter, but it is more complex because a tilt rotor aircraft has a flapping degree of freedom which is not present on a propeller. The rotor flapping degree of freedom causes additional destabilizing forces that can lead to instabilities that are not possible on a conventional propeller.

The physical mechanism for this instability is the destabilizing rotor shear forces that are transmitted to the wing/pylon system in a high-speed airplane flight condition. These destabilizing rotor shear forces are generated as a result of the rotor flapping response to a disturbance such a gust, or a pilot maneuver.

Figure 8A:
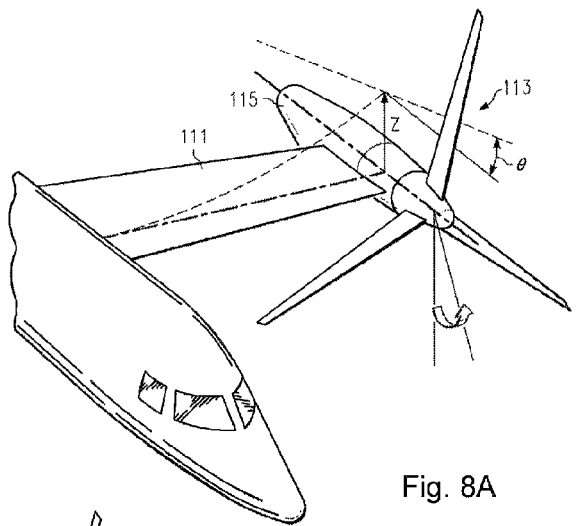
FIG. 8A is a simplified pictorial representation of the response of a wing/pylon/rotor assembly to a disturbance.
Figure 8B:
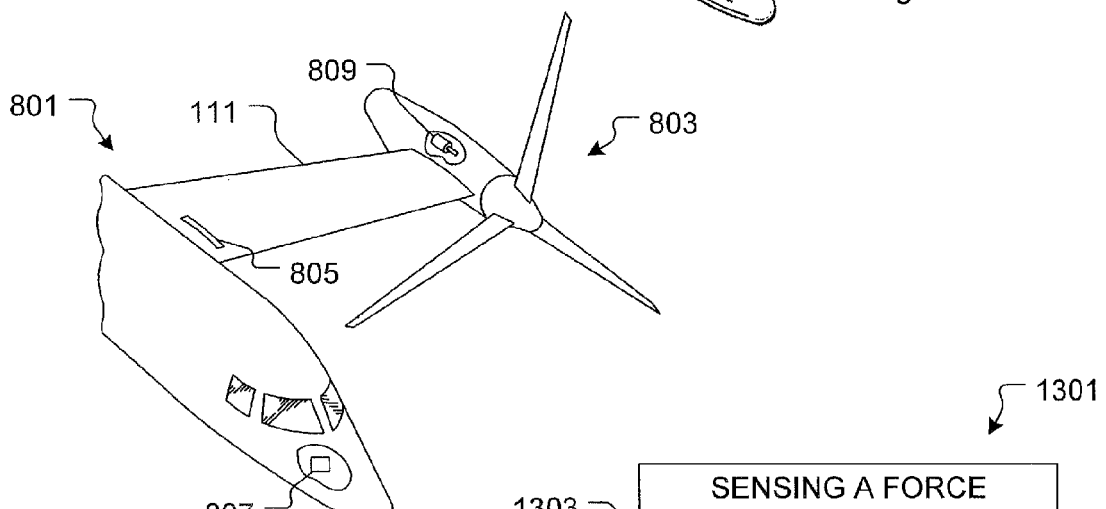
FIG. 8B is the simplified pictorial of FIG. 8A depicting the control system according to the preferred embodiment.
Figure 9:
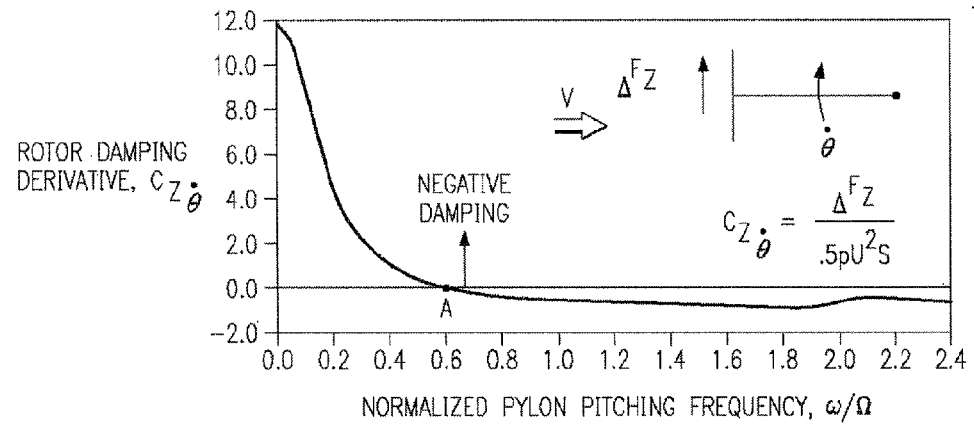
FIG. 9 depicts the causes of prop rotor aeroelastic instability.
Figure 9:
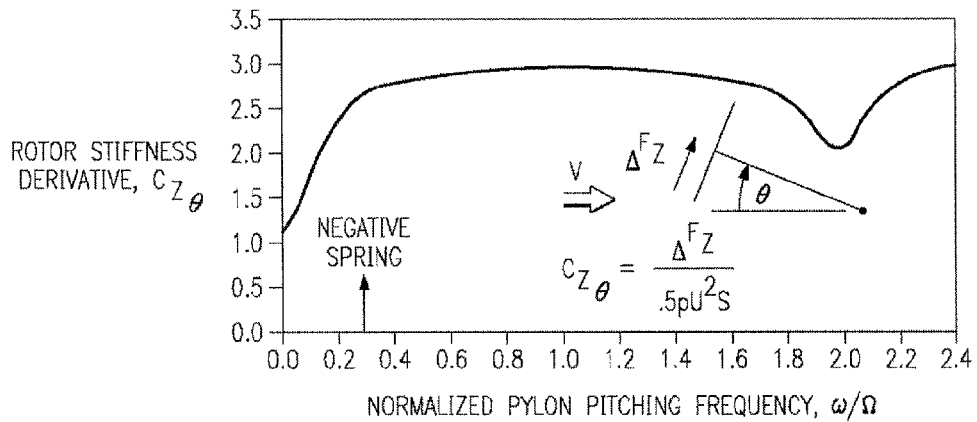
Figure 9:
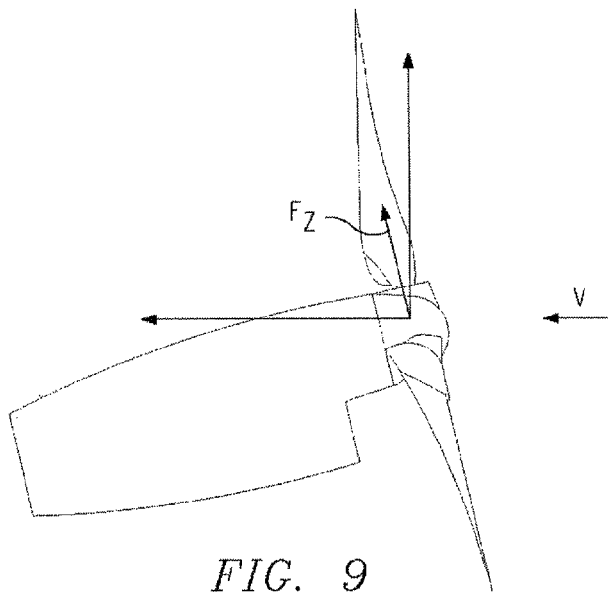

Referring now to FIG. 8A in the drawings, a disturbance causing a wing 111 to vibrate at one or more of its fundamental natural frequencies is illustrated. Because rotor 113 and its control system are attached to wing 111 and pylon 115, the motion of the wing/pylon 111, 115 changes the angle of attack of the rotor system 113 and causes the rotor system 113 to flap. For a specific rotor design configuration, there exists a range of wing vibration frequencies where the rotor system flapping will create destabilizing hub shears, which are a source of negative damping and negative stiffness, as shown in FIG. 9.

FIG. 8A shows an oblique view of the rotary aircraft with a control system 801 operably associated with wing 111 and rotary system 113. Control system 801 is configured to overcome the problems commonly associated with disturbances created by rotary system 113 on wing 111. In particular, control system 801 comprises a sensor 805 carried on wing 111 for sensing disturbances caused thereto by rotary system 113, and a subsystem 807 configured to counteract the disturbances by relaying a message to the one or more actuators 809 operably associated with the rotary system for changing the pitch angle and/or other control movements of the rotary blades. This feature greatly reduces, and in some cases eliminates, the adverse forces exerted on the wing by the rotary system.

In accordance with the preferred embodiment, sensor 805 senses the bending moment of the wing and is preferably placed on both the suction and pressure surfaces of the wing. During operation, sensor 805 senses bending movement of the wing during flight and relays the sensed movement to control subsystem 807. Subsystem 807 includes the required software and hardware for determining whether the sensed data is potentially harmful to wing 111. If the movement is potentially harmful, then the subsystem relays a signal to one or more actuators 809 operably associated with rotary system 113. The actuators 809 thereafter adjust rotary system 113 such that the adverse forces exerted on wing 111 are reduces and/or eliminated.

It will be appreciated that the control system 801 can be configured to adjust the blades individually if the force exerted on the wing will potentially harm the structural integrity of the wing. Further, sensor 805 could also be adapted to sense the forces exerted on the wing by the external air loads acting on the wing and/or external air loads acting on the other parts of the aircraft.

Referring now to FIG. 9 in the drawings, if the wing/pylon is vibrating at frequencies lower than Point A, the rotor system generates negative stiffness and negative damping. The negative damping from the rotor hub shears can overcome the inherent structural damping in the wing/pylon system and eventually lead to an aeroelastic instability in high speed forward flight.

Figure 10A:
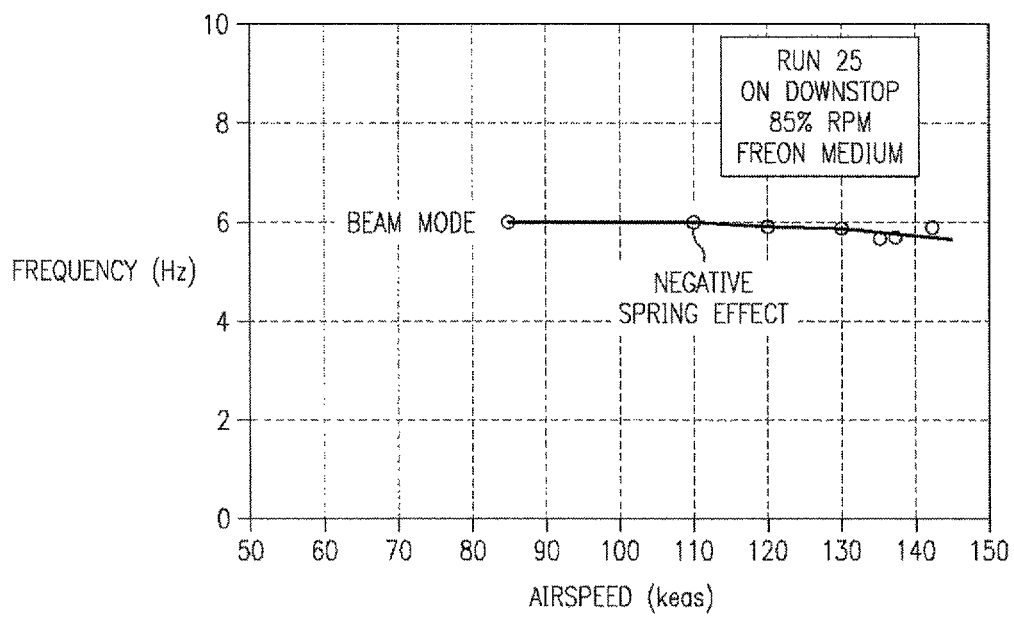
FIGS. 10A and 10B are graphical representations of frequency, dampening, and airspeed, which are measured on a small scale aircraft with tilt rotor assemblies.
Figure 10B:
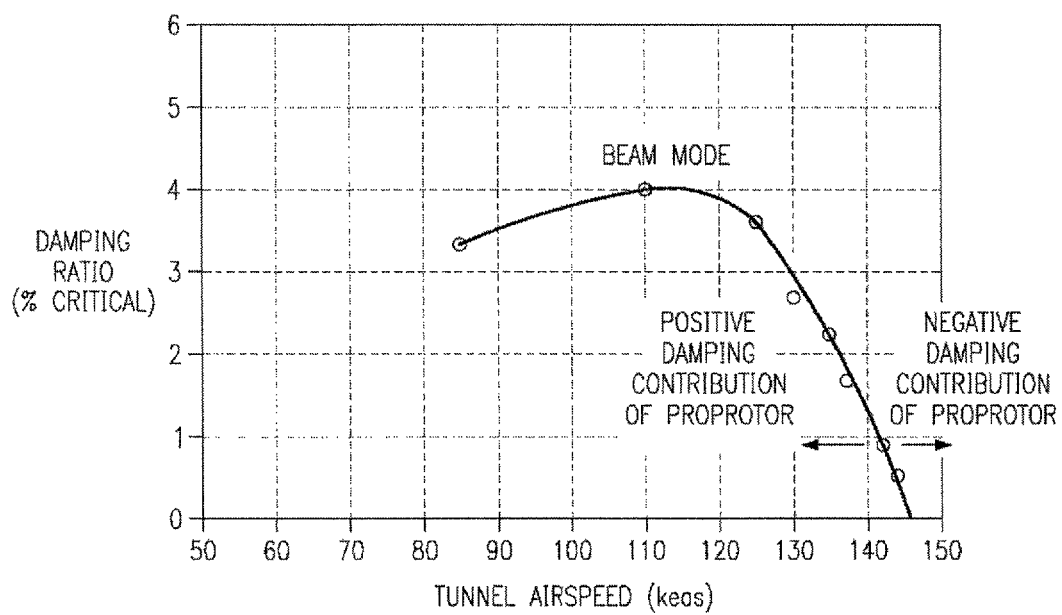

Referring now to FIGS. 10A and 10B in the drawings, plots of measurements from a small scale tilt rotor aeroelastic model are illustrated. In FIG. 10A, a plot of frequency versus airspeed is shown. In FIG. 10B, a plot of damping ratio versus tunnel airspeed is shown. As is shown, at low airspeeds, the rotor system can contribute positive damping and stabilize the aircraft, but at high airspeeds, the rotor creates negative damping, which eventually leads to an instability at speeds above 146 knots (model scale). Several solutions are available to improve the aeroelastic stability of a tilt rotor. The wing/pylon stiffness and mass properties can be tailored to maximize the stability of the system. The rotor system can also be improved by incorporating beneficial rotor frequency tuning, aeroelastic coupling, and by adjusting the kinematics of the rotor controls.

Another instability to be avoided is the rotor flap/lag instability. Unlike the prop rotor aeroelastic instability, the flap/lag instability is confined to the isolated rotor and does not significantly interact with the dynamics of the wing and pylon. This instability is a result of coalescence of the rotor flapping mode frequency and the rotor inplane bending mode frequency. In high speed airplane mode flight, the aerodynamic forces acting on the rotor are very large and can significantly alter the frequency and damping of these two rotor modes. In the case of an improperly designed rotor system, the frequencies of these two rotor modes can approach each other as airspeed is increased. As this occurs, the two modes will strongly interact, and will blend their characteristics to form two highly coupled modes. Each of these coupled modes will be affected by the strong aerodynamic forces; however, one mode will be stabilized while the other mode is destabilized. The rotor design parameters must be properly selected to avoid the coalescence of the rotor modes to prevent the flap/lag instability.

Figure 11:
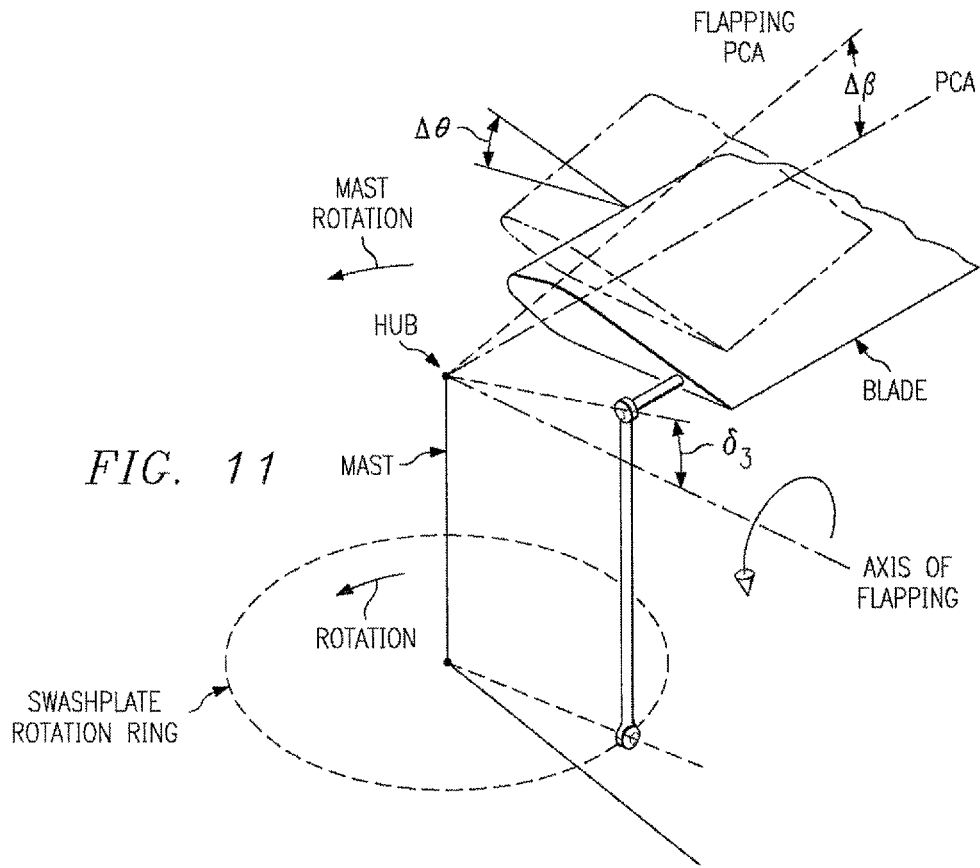
FIG. 11 is a simplified representation of the effect of delta-3 angle in a control system.

One of the most important rotor parameters affecting the aeroelastic stability is the rotor pitch-flap coupling, or delta-3 angle. FIG. 11 shows a schematic of the rotor hub which illustrates the delta-3 angle used on a rotor system. Because one end of the pitch horn is restrained by the pitch link, and the other end is attached to the flapping blade, a pitch change will occur as the blade flaps. Hence, the delta-3 angle produces coupling between rotor flapping and rotor blade pitch. As the rotor blade flaps upward, a rotor system with a positive delta-3 angle will experience a nose-down pitch, while a rotor with a negative delta-3 angle will experience a nose-up pitch. The equation defining the pitch change caused by delta-3 is defined as: $\Delta\theta = -\tan(\text{delta-3})\Delta\beta$ The pitch/flap coupling caused by the delta-3 angle alters the aerodynamic forces acting on the rotor, which modifies the flapping frequency. The rotor delta-3 angle is used to reduce rotor flapping amplitudes during gust disturbances or pilot maneuvers. This prevents excessive flapping which can cause high rotor loads and mechanical interferences. On a tilt rotor, the delta-3 angle can be adjusted by moving the location of the pitch horn relative to the flapping axis as shown in FIG. 11. On a three bladed tilt rotor aircraft, the delta-3 angle is usually set to values near −15 degrees, which provides an adequate level of flapping attenuation. Larger values of delta-3 would reduce flapping even more, but this can aggravate the aeroelastic stability problems described above. The influence of delta-3 on aeroelastic stability is described below.

Because the delta-3 coupling alters the flapping frequency of a rotor, it affects the basic rotor flapping response characteristics, as well as the destabilizing rotor shears. This influences both the prop rotor aeroelastic instability and the rotor flap-lag instability.

For the prop rotor aeroelastic stability problem, large negative values of delta-3 angle will increase the magnitude of the destabilizing rotor hub shears shown in FIG. 9. The increase in negative rotor damping will reduce the stability boundary of the aircraft. Likewise, large positive values of delta-3 are beneficial for prop rotor stability.

Large positive values of delta-3, however, will cause the flapping frequency to increase and approach the rotor inplane mode frequency. This can lead to a rotor flap/lag instability at high speed. Likewise large negative values of delta-3 will improve the rotor flap/lag stability by preventing coalescence of these two rotor modes.

The selected design value of delta-3 is a compromise between the requirement for acceptable flapping reduction, good prop rotor aeroelastic stability, and acceptable flap/lag stability.

Figure 12:
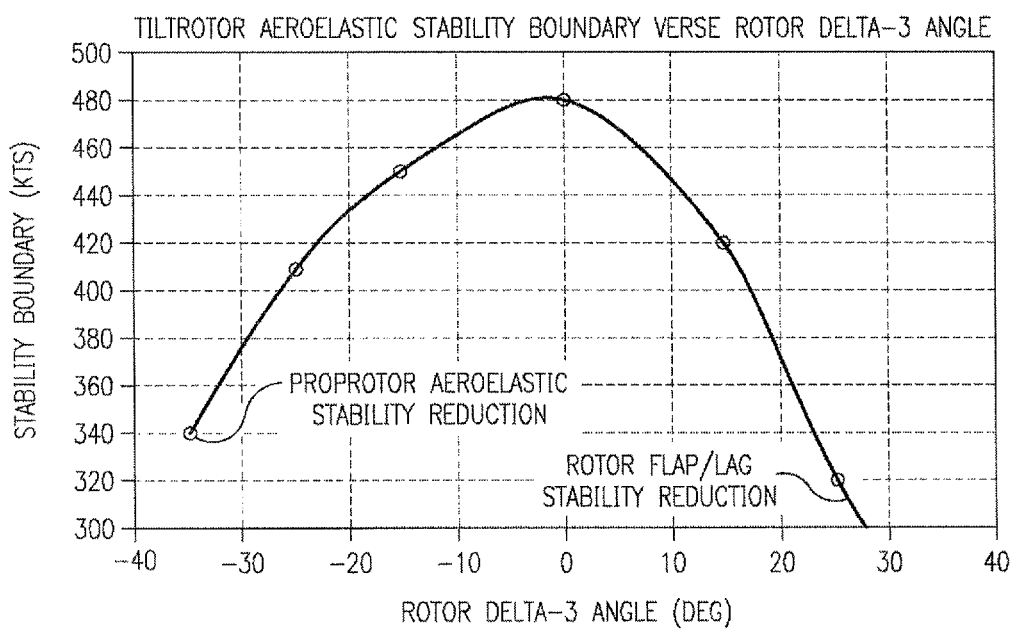
FIG. 12 is a graphical representation of the effect of delta-3 on aeroelastic stability in a tilt rotor aircraft.

Referring now to FIG. 12 in the drawings, a plot of rotor delta-3 angle versus stability boundary is illustrated. FIG. 12 presents the calculated stability boundary for a typical high-speed tilt rotor as the rotor delta-3 angle is varied. As is shown, if the delta-3 angle is set at zero degrees, the stability is optimum, but there is no beneficial reduction in rotor flapping response due to gusts and maneuvers. For large negative values of the delta-3 angle, the prop rotor aeroelastic stability will be degraded significantly. At large positive values of delta-3 angle, the rotor flap-lag instability occurs and seriously limits the useable airspeed range. Thus, a small delta-3 angle near about −15 degrees provides a good compromise between flapping control and aeroelastic stability for a tilt rotor.

Figure 13:
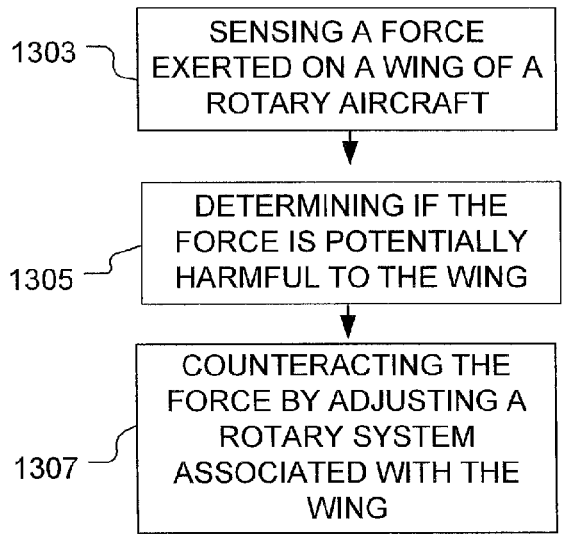
FIG. 13 is a flowchart representation of the method to control adverse wing movement caused by the rotary system of the tilt rotor aircraft.

Referring next to FIG. 13 in the drawings, a flowchart 1301 depicting the preferred method of controlling adverse forces exerted on the aircraft wing. In particular, the method includes the process of controlling adverse bending, pitching, and/or other movements exerted on the aircraft wing by the rotary system. Box 1303 illustrates the first process step, which includes sensing the wing movements with a sensor. Thereafter, the sensor relays the sensed movement to a control subsystem. The subsystem determines whether the forces are potentially damaging to the wing, depicted in box 1305. If the forces are potentially damaging, then the rotary system is adjusted to counteract such forces, as depicted in box 1307. This feature is achieved through pitching, tilting, and/or adjustments to the rotor blades and/or the pylons.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary aircraft comprising:
   a fuselage;
   a wing rigidly attached to the fuselage;
   a rotary system pivotally attached to the wing, the rotary system having:
   a plurality of rotor blades;
   an actuator operably associated with the plurality of rotor blades; and
   a control system operably associated with the rotary system, the control system having:
     a first sensor carried on a pressure surface of the wing and a second sensor carried on the suction surface of the wing;
     wherein the first sensor and the second sensor are operably associated with each other such that the first sensor senses movement of pressure surface of the wing and the second sensor senses movement of the suction surface of the wing, and wherein the sensed movement of the pressure surface and the sensed movement of the suction surface determine a bending movement exerted on the wing by the rotary system; and
     a subsystem in data communication with the first sensor and the second sensor and configured to receive the sensed bending movement of the wing and determine whether the sensed bending movement is potentially harmful to the wing;
   wherein the control system adjusts the movement of the plurality of blades via the actuators if the bending movement of the wing is potentially harmful.

2. The rotary aircraft of claim 1, the rotary system further comprising:
   a swashplate operably associated with the plurality of rotor blades, the swashplate being configured to adjust movement of the plurality of rotor blades.

3. The rotary aircraft of claim 2, wherein the actuator is operably associated with the swashplate, the actuator being configured to adjust movement of the swashplate.

4. The rotary aircraft of claim 1, wherein the control system adjusts the movement of the plurality of blades individually upon detection of a potentially harmful bending movement of the wing.

5. The rotary aircraft of claim 1, the rotary system further comprising:
   a mast; and
   a yoke coupled to mast, the yoke being coupled to the plurality of rotor blades.

6. The rotary aircraft of claim 5, wherein each of the plurality of rotor blades are coupled to the yoke with a delta-3 hinge having a delta-3 angle of about −45 degrees.

7. The rotary aircraft of claim 5, wherein each of the plurality of rotor blades are coupled to the yoke with a delta-3 hinge having a delta-3 angle of greater than −15 degrees.

8. The rotary aircraft of claim 1, wherein the plurality of rotor blades is at least three rotor blades.

* * * * *